(12) United States Patent
Schatz et al.

(10) Patent No.: US 7,938,448 B2
(45) Date of Patent: May 10, 2011

(54) MOBILE VEHICLE DETAILING SYSTEM

(76) Inventors: John Schatz, West Springfield, PA (US); Kevin Schatz, Lewis Center, OH (US)

( * ) Notice: Subject to any disclaimer, the term of this patent is extended or adjusted under 35 U.S.C. 154(b) by 403 days.

(21) Appl. No.: 12/275,429

(22) Filed: Nov. 21, 2008

(65) Prior Publication Data

US 2009/0200787 A1    Aug. 13, 2009

Related U.S. Application Data

(60) Provisional application No. 61/006,986, filed on Feb. 8, 2008.

(51) Int. Cl.
*B60P 3/22* (2006.01)
*B05B 3/00* (2006.01)

(52) U.S. Cl. ........... 280/830; 15/339; 15/97.3; 239/722; 239/723; 239/744; 239/750; 239/751; 239/752; 239/753

(58) Field of Classification Search .................. 280/830; 15/339, 97.3; 239/722, 723, 744, 750, 751, 239/752, 753

See application file for complete search history.

(56) References Cited

U.S. PATENT DOCUMENTS

| | | | | |
|---|---|---|---|---|
| 3,772,723 A * | 11/1973 | Krimm | ................ | 15/53.3 |
| 3,917,168 A * | 11/1975 | Tenney | ................ | 239/13 |
| 6,481,448 B2 * | 11/2002 | Mathieu | ................ | 134/109 |
| 6,766,966 B2 * | 7/2004 | You | ................ | 239/146 |
| 6,973,975 B1 * | 12/2005 | Adamson et al. | ................ | 169/24 |
| 2005/0066997 A1 * | 3/2005 | Watford | ................ | 134/10 |
| 2006/0090776 A1 * | 5/2006 | Watford | ................ | 134/33 |
| 2006/0108449 A1 * | 5/2006 | Sodemann et al. | ................ | 239/391 |
| 2011/0017848 A1 * | 1/2011 | Keith | ................ | 239/722 |

\* cited by examiner

*Primary Examiner* — Paul N Dickson
*Assistant Examiner* — Marlon A Arce
(74) *Attorney, Agent, or Firm* — Mueller Smith & Okuley, LLC

(57) ABSTRACT

The mobile vehicle detailing system is a system for detailing a motor vehicle adapted for mounting the rear of a truck or van. The mobile vehicle detailing system has a water storage tank that has outlets for filling buckets and water containers and provides a source of water. A surround box, in which is disposed the water storage tank, has an integral front section that extends between the front seats of a van or truck and provides storage for files and receipts. A pressure washer, generator and storage box are mounted on a sliding platform that can be pulled out from the vehicle for easy access.

20 Claims, 5 Drawing Sheets

MOBILE VEHICLE DETAILING SYSTEM

CROSS-REFERENCE TO RELATED APPLICATIONS

This application claims benefit of U.S. Provisional Application Ser. No. 61/006,986, filed on Feb. 8, 2008, the disclosure of which is expressly incorporated herein by reference.

STATEMENT REGARDING FEDERALLY SPONSORED RESEARCH

Not applicable.

BACKGROUND

The present disclosure relates to vehicle detailing systems and more particularly to a mobile vehicle detailing system that is mounted in the rear of a vehicle, such as, for example, a truck or van.

Automobile detailing is the practice of performing an extremely thorough cleaning, polishing, and waxing of an automobile, both inside and outside, to produce a show-quality level of detail. It can be practiced for personal satisfaction, and it is sometimes performed to prepare a car for a show that features the appearance of cars. Most cars, both new and used, also are detailed before sale by dealerships. Elements of exterior detailing include, for example, claying, polishing, and waxing. Interior detailing involves the cleaning of the interior of a vehicle using, for example, vacuums, liquid cleaners, and brushes. Engine detailing involves cleaning the engine bay area of dirt and grease by using, for example, degreasers and all-purpose cleaners.

While there are no specific guidelines for what actually makes up automobile detailing, it is typically considered more extensive than washing and drying a car, and will often involve many steps. Main goals are typically beautification, but can also touch other areas such as, for example, minor paint repair, protection and sealant, surface restoration, as well as thoroughly cleaning areas that are normally ignored, such as, for example, the engine and under the chassis. A variety of shampoos, cleaners, degreasers, protectants, lubricants, polishes, clay bars, and waxes have developed over time to suit various demands of consumers and professionals.

There are many advantages to operating a vehicle detailing business from the back of a vehicle, such as a van, truck, or trailer. Start up costs and monthly operating costs are significantly lower. Additionally, there is the advantage of higher hourly rates from clients who prefer the convenience of having their vehicles detailed at their home or place of business. Of course, such detailing services also can be offered to owners of planes, boats, recreational vehicles, and the like.

Thus, a mobile vehicle detailing system solving the aforementioned problems is desired.

BRIEF SUMMARY

The mobile vehicle detailing system is a complete and integrated vehicle-based system for detailing a motor vehicle. The mobile vehicle detailing system has a water storage tank that is mounted in the back of a mobile vehicle, such as, for example, a truck or van. The water storage tank is vented to prevent overflow into the vehicle and also provides a gravity feed water supply for a pressure washer and a water supply for filling buckets and other water containers. The water storage tank is disposed in a surround box that has a front portion that extends between the front seats of a truck or van. The front portion has two boxes with hinged lids that may be used for file storage and for receipts and brochures. The surround box also has a recessed storage area on its upper surface that provides secure storage for cleaners, sprays, degreasers and other items used in the interior and exterior motor vehicle detailing.

A pressure washer, generator, and storage box are mounted on a sliding platform. The platform is mounted on a slide-rail system that has a pair of pipes that are inserted into a pair of elongated rails. The pipes slide freely in and out of the rails, and have upturned ends that function as handles. The platform can be easily pulled out of the back of a motor vehicle for easier access to the pressure washer and the generator. The mobile vehicle detailing system can be adapted to fit a variety of vans, trucks or other types of motor vehicles.

These and other features of the present disclosure will become readily apparent upon further review of the following specification and drawings.

BRIEF DESCRIPTION OF THE DRAWINGS

For a fuller understanding of the nature and advantages of the present apparatus and system, reference should be had to the following detailed description taken in connection with the accompanying drawings, in which.

Similar reference characters denote corresponding features consistently throughout the attached drawings, which will be described in greater detail below.

DETAILED DESCRIPTION

The present disclosure relates to the detailing of vehicles, including, for example, automobiles, trucks, recreational vehicles, planes, boats, and the like; and more particularly to a mobile vehicle detailing system that mounts in the rear of a mobile vehicle, which typically is a van or similar motorized vehicle. By making the detailing system mobile, detailing services can be taken to the customer or vehicle owner, regardless of whether they are at home or at work. A degree of convenience, thus, is offered to the vehicle owner.

Figure 1:
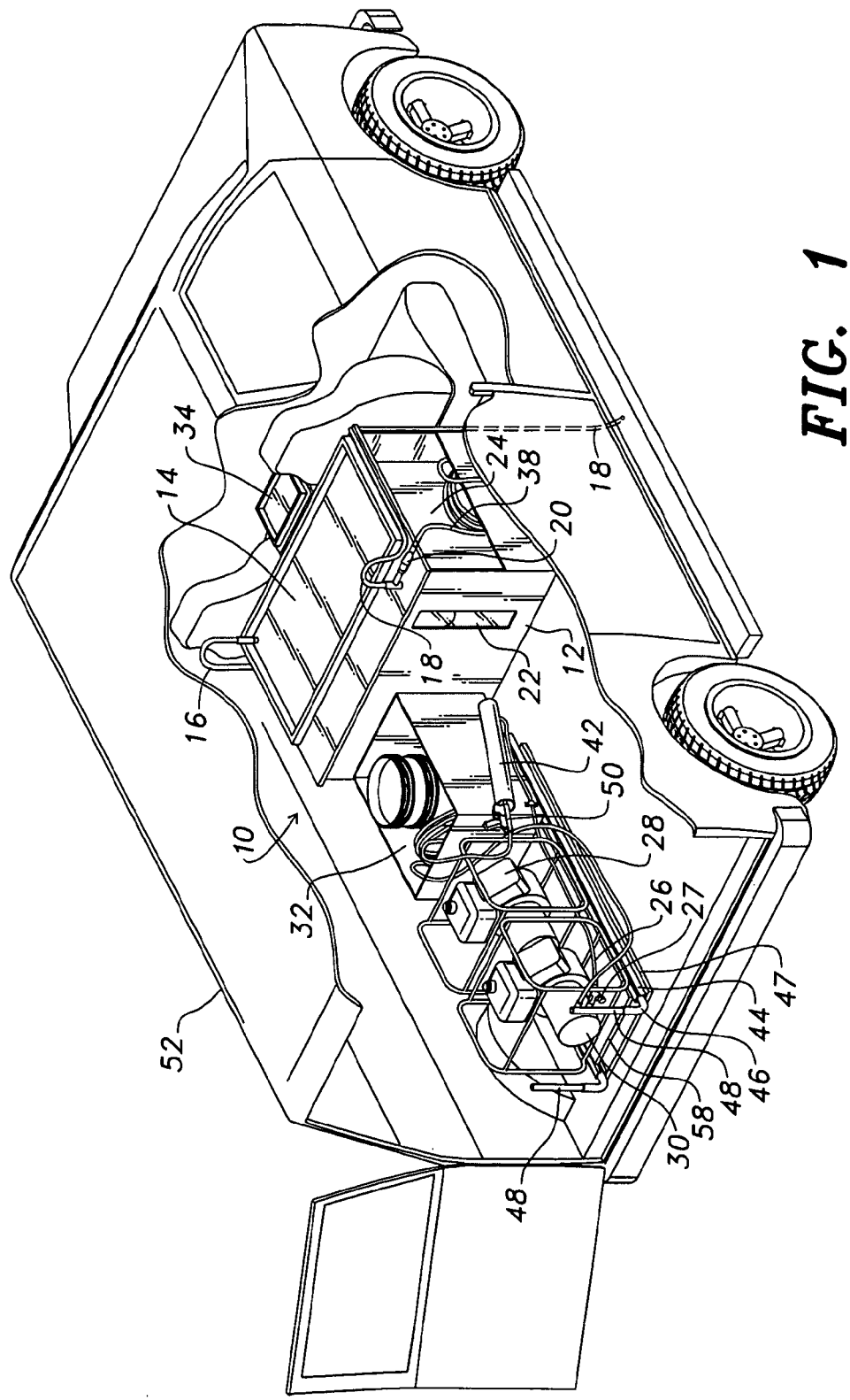
FIG. 1 is a perspective view of a mobile vehicle detailing system according to the present disclosure, shown with the slide in a retracted position.

Referring initially to FIG. 1, the mobile detailing apparatus, generally identified by reference numeral 10, is seen mounted in the rear of a motorized vehicle, 52. Auto detailing system 10 includes a generally rectangular water storage tank surround box, 12, which will be described in greater detail in connection with FIGS. 2 and 3. A window, 22, is provided in one side of surround box 12 to allow a user to monitor the water level in a water storage tank, 15 (see FIG. 3). Surround box 12 has a raised storage area, 14, on its upper surface, which is intended for storing cleaners, spray bottles, and other products used in automobile detailing work. A first overflow or vent hose, 16, is disposed on the top surface corner of surround box 12. A second overflow or vent hose, 18, is disposed on the opposite corner of surround box 12 (see FIGS. 2 and 3). Both vent hoses 16 and 18 are connected to water storage tank 15, which may be made of polyurethane or other plastic material. Vent hoses 16 and 18 prevent water from spilling into interior of a motor vehicle, 52, in case of accidental overfilling of water storage tank 15. Also, vent hose 18 has an attached quick connector, 20, to allow a user to fill water storage tank 15. A hose, 38, is attachable to quick connector 20 for filling tank 15. Hose 38 is stored in a storage compartment, 24, on the side of surround box 12 and fits in a bracket, 39, disposed on a side of surround box 12. During travel of vehicle 52 to and from job sites, hose 38 can be closed by shut-off valve 20 to prevent unwanted loss of water from tank 15.

A pressure washer, 30, an electric generator, 28, and a storage box, 32, are mounted on a sliding platform, 58. A hose, 26, connects pressure washer 30 to water storage tank 12. Storage box 32 has a hollow cylinder, 42, mounted on the side of storage box 32 for storing the wand, 50, for pressure washer 30. Sliding platform 58 is mounted between a pair of elongated pipes, 46. Pipes 46 are inserted into two elongated rails, 44, and slide freely inside rails 44, allowing platform 58 to be pulled out of the vehicle for access to pressure washer 30 and generator 28. Each pipe 46 has an upturned end, 48, forming handles for pulling sliding platform 58 out of vehicle 52.

This equipment can be mounted to the floor of vehicle 52 by bolts, tie downs, or a variety of additional mounting equipment. Desirably, this mounting keeps the equipment in place during transportation and use of thereof. Desirably, also, the equipment can be removed for cleaning, maintenance, replacement, or the like.

Figure 2:
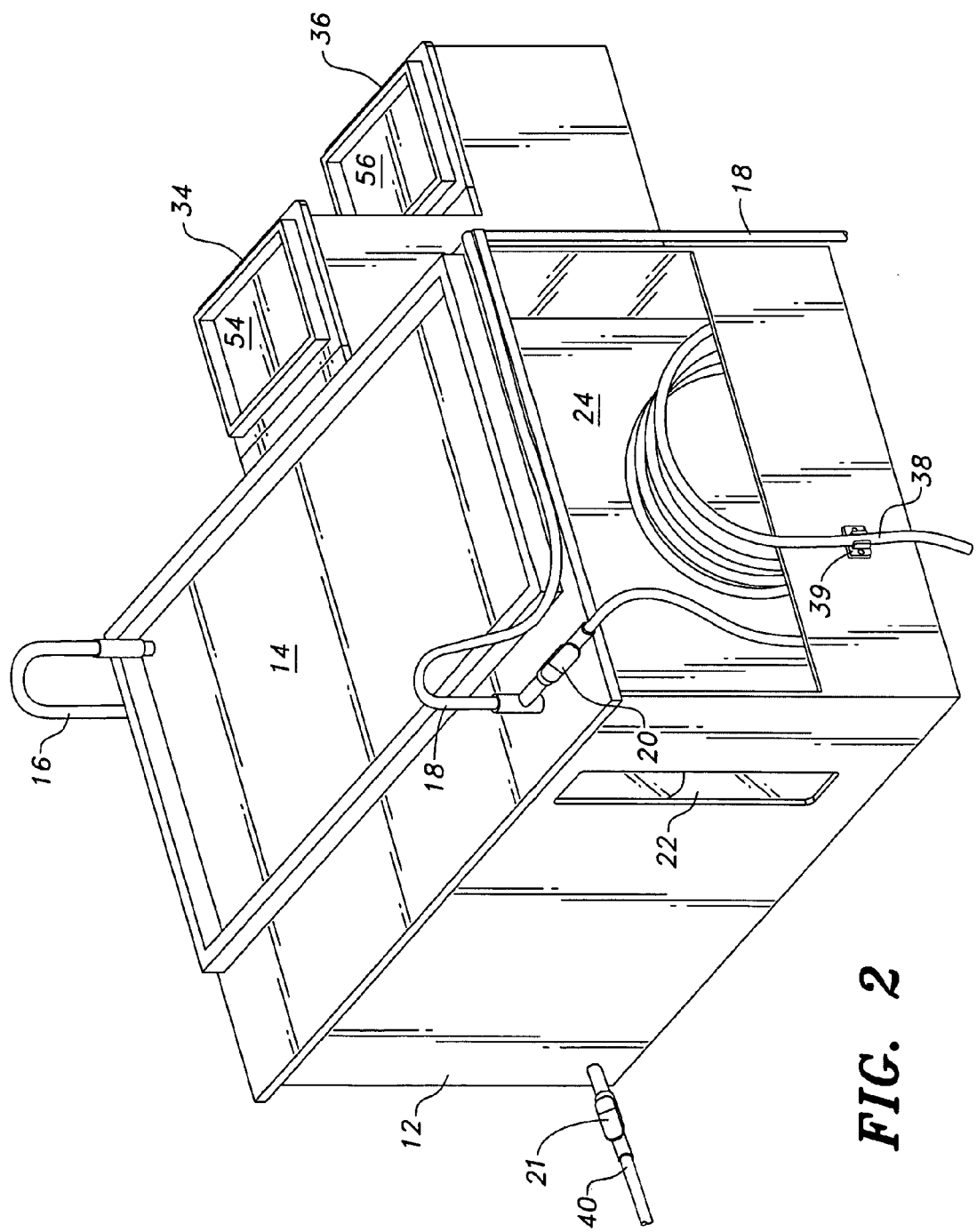
FIG. 2 is a detailed perspective view of a water storage tank in a mobile vehicle detailing system according to the present disclosure, as seen from the rear of the tank.
Figure 3:
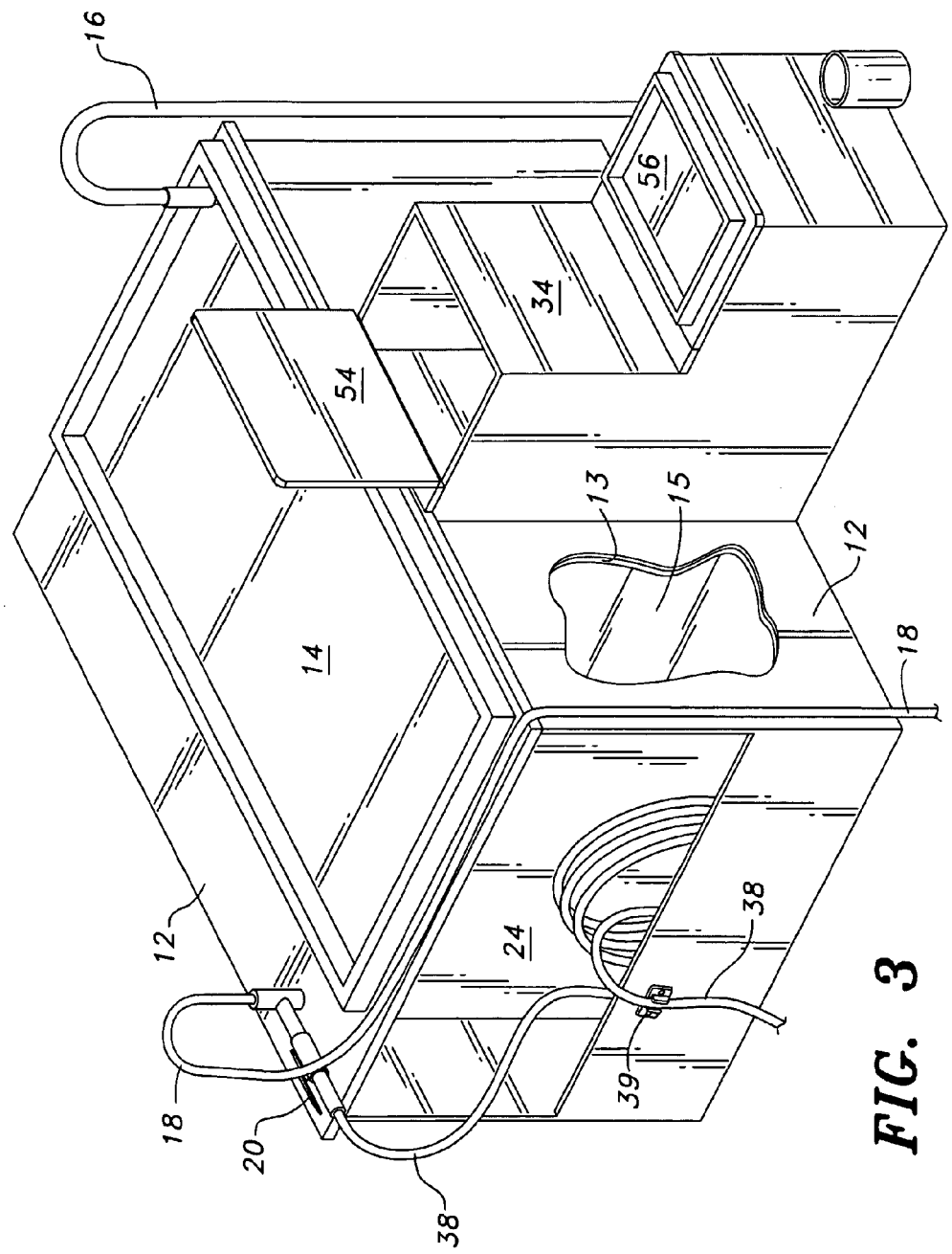
FIG. 3 is a detailed perspective view of the water storage tank of FIG. 2, as seen from the front of the tank.

FIGS. 2 and 3 are perspective views of surround box 12, showing vent hose 16 and vent hose 18 on the top surface of surround box 12, but in fluid connection with water storage tank 15. A gravity feed line, 40, on the back of surround box 12 provides water from water storage tank 15 for pressure washer 30. Line 40 is equipped with a manually operable, shut-off valve, 21, so that the operator can close the line during transportation of the equipment to and from job sites.

The front of surround box 12 has an upper box, 34, and a lower box, 36, integrally formed and extending from the front of surround box 12. Upper box 34 and lower box 36 are adapted to extend into the cab between the front seats of vehicle 53. Upper box 34 and lower box 36 each have hinged lids, 54 and 56, respectively, for access to the box interior. Lid 54 is shown in an open position in FIG. 3. The operator has convenient access to boxes 34 and 36 while seated in a driving position in the cab of vehicle 52. The operator can store customer files, brochures, CB unit, or the like, in boxes 34 and 36. In FIG. 3, tank 15 is seen in the cut-away along with an insulation layer, 13, that is interposed between tank 15 and surround box 12.

Figure 4:
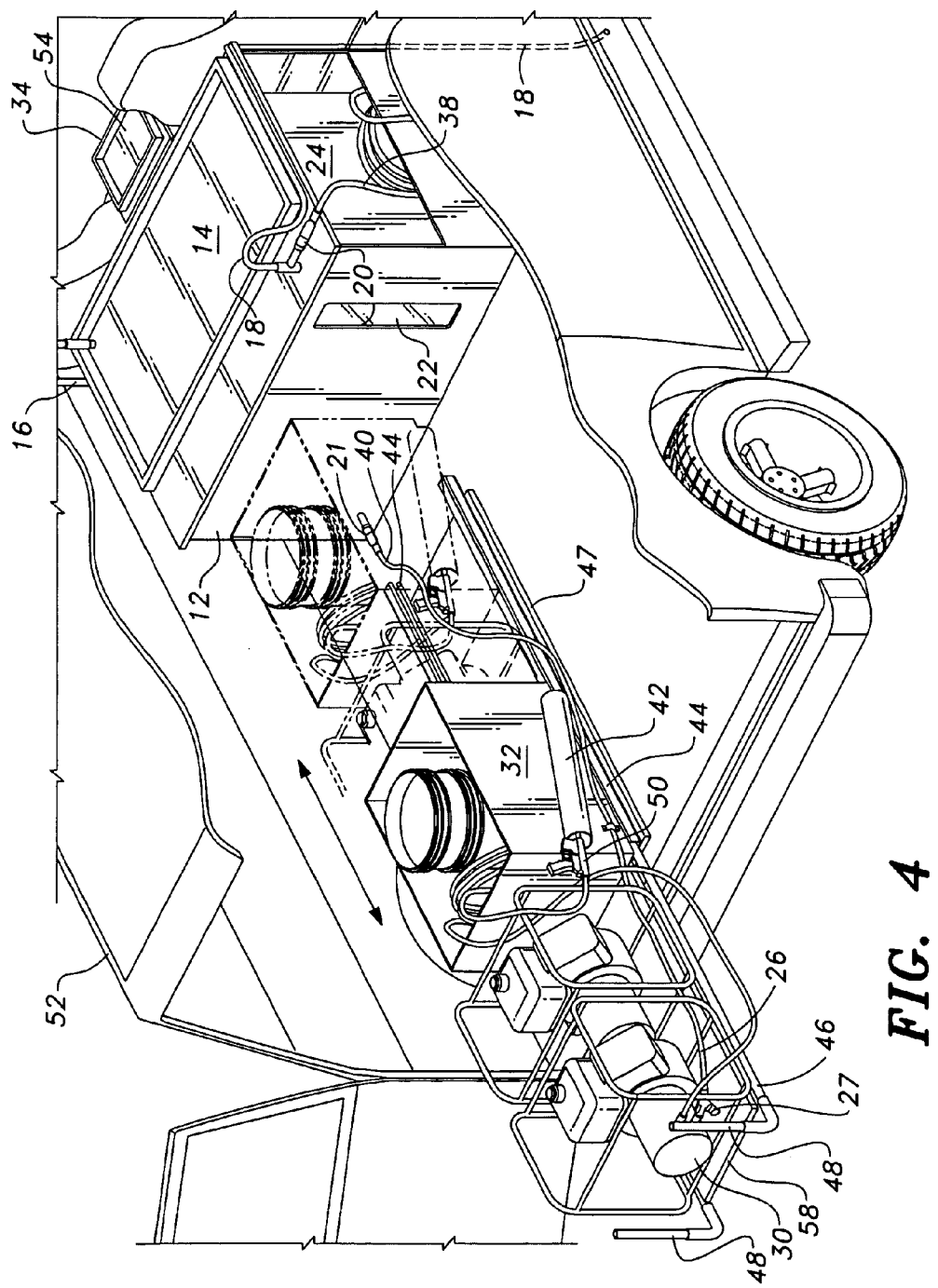
FIG. 4 is an environmental, perspective view of a mobile vehicle detailing system according to the present disclosure, shown with the slide in an extended position.

FIG. 4 shows sliding platform 58 in the extended position, with pressure washer 30 and generator 28 supported in cantilever fashion outside of vehicle 52 for ready access when detailing a vehicle. Generator 28 is a gasoline-powered generator that supplies electrical power for pressure washer 30, and also for vacuum cleaners or other small appliances used in detailing work. Other power sources could be substituted the gasoline-powered generator, as those skilled in the art will appreciate. Water feed line 40 is seen clipped with a clip, 47, as it runs to a "Y" connector, 27, connected to power washer 30. The operator can affix a drain hose (not shown) to Y-connector 27 to fill buckets with water, if desired.

Figure 5:
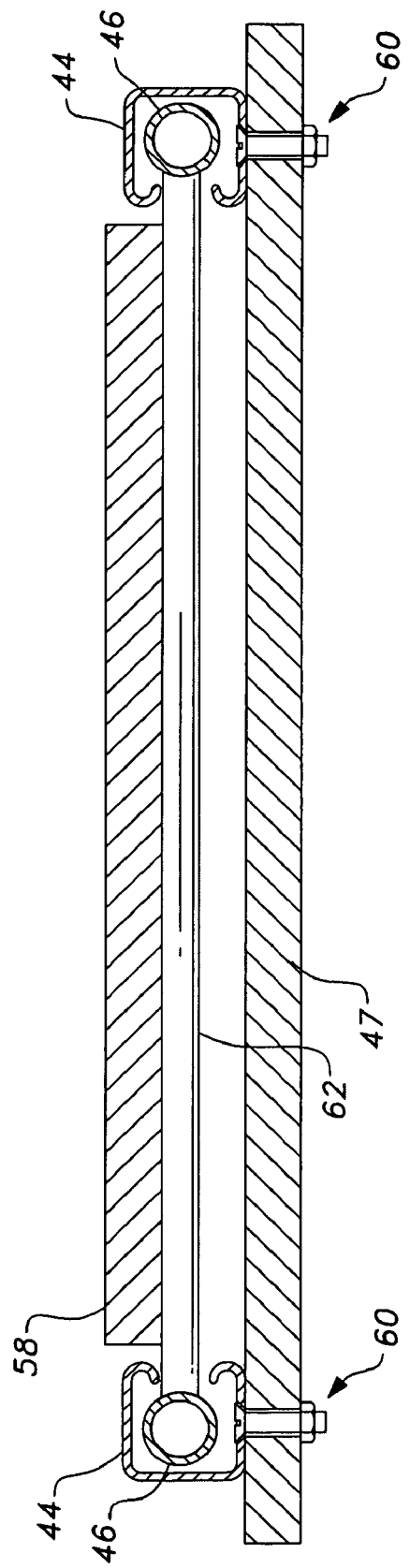
FIG. 5 is a transverse section view of an exemplary slide in a mobile vehicle detailing system according to the present disclosure.

FIG. 5 is a section view of an exemplary slide rail system. Pipes 46 are shown inside generally C-shaped rails 44, which form tracks or guides for pipes 46. A base, 47, is shown with bolts, 60, for mounting to the floor of a motor vehicle. Elongated pipes 46 are connected by a plurality of transverse members, 62, which define a slide frame. The slide may have cooperating stop members on rails 44 and on pipes 46 at the end opposite the handle to preclude sliding pipes 46 out of the rails 44. Pressure washer 28 and generator 30 may be mounted directly on the slide frame, or may be mounted on a platform, 58 supported by pipes 46 and/or transverse members 62. Alternatively, ball bearings or the like can be added to the slide rail system to facilitate its movement.

While the apparatus has been described with reference to various embodiments, those skilled in the art will understand that various changes may be made and equivalents may be substituted for elements thereof without departing from the scope and essence of the disclosure. Additionally, many modifications may be made to adapt a particular situation or material to the teachings of the disclosure without departing from the essential scope thereof. Therefore, it is intended that the disclosure may not be limited to the particular embodiments disclosed, but that the disclosure will include all embodiments falling within the scope of the appended claims. In this application the US measurement system is used, unless otherwise expressly indicated. Also, all citations referred to herein are expressly incorporated herein by reference.

We claim:

1. A mobile vehicle detailing system adapted for mounting in a vehicle, which comprises:
    (a) a slide adapted for mounting in a vehicle, the slide being movable between a retracted position in which the slide is entirely disposed within the vehicle and an extended position in which a portion of the slide extends from the vehicle;
    (b) a pressure washer mounted on the slide;
    (c) a generator and pressure washer mounted on the slide, the pressure washer being electrically connected from the generator, the pressure washer and the generator being extended from the vehicle when the slide is in the extended position; and
    (d) a surround box with water storage tank disposed therein is adapted for mounting in the vehicle, the pressure washer being connected to the tank, the tank being adapted for providing a source of water to the pressure washer.

2. The mobile vehicle detailing system of claim 1, wherein said slide comprises a first rail mounted to said vehicle and a second rail slidably attached to said first rail and to which said pressure washer and generator are mounted.

3. The mobile vehicle detailing system of claim 2, wherein said first and second rails comprise a pair of nested pipes.

4. The mobile vehicle detailing system of claim 2, wherein said rails are fitted with ball bearings.

5. The mobile vehicle detailing system of claim 1, wherein said surround box is fitted with a sight glass for determining the depth of water in the water storage tank, and said water storage tank is fitted with a vent overflow line.

6. The mobile vehicle detailing system of claim 1, wherein a storage shelf is disposed atop said water storage tank.

7. The mobile vehicle detailing system of claim 1, wherein said surround box carries storage bins that extend adjacent to a driver of said vehicle.

8. The mobile vehicle detailing system of claim 1, wherein water storage tank is fitted with an openable outlet to which a hose is attached.

9. The mobile vehicle detailing system of claim 8, wherein said surround box is fitted with a storage compartment adapted to store said hose.

10. The mobile vehicle detailing system of claim 1, wherein said generator is gasoline powered.

11. A mobile vehicle detailing system, comprising:

(a) a vehicle;

(b) a slide mounted in the vehicle, the slide being movable between a retracted position in which the slide is entirely disposed within the vehicle and an extended position in which a portion of the slide extends from the vehicle;

(c) a pressure washer mounted on the slide;

(d) a generator and pressure washer mounted on the slide, the pressure washer and the generator being extended from the vehicle when the slide is in the extended position; and (e) a surround box, in which is disposed a water storage tank, is mounted in the vehicle, the pressure washer being connected to the tank, the tank being adapted for providing a source of water to the pressure washer.

12. The mobile vehicle detailing system of claim 11, wherein said slide comprises a first rail mounted to said vehicle and a second rail slidably attached to said first rail and to which said pressure washer and generator are mounted.

13. The mobile vehicle detailing system of claim 12, wherein said first and second rails comprise a pair of nested pipes.

14. The mobile vehicle detailing system of claim 12, wherein said rails are bearing type slide rails.

15. The mobile vehicle detailing system of claim 11, wherein said surround box is fitted with a sight glass for determining the depth of water in the water storage tank, and said water storage tank is fitted with a vent overflow line.

16. The mobile vehicle detailing system of claim 11, wherein a storage shelf is disposed atop said surround box.

17. The mobile vehicle detailing system of claim 11, wherein said surround box carries storage bins that extend adjacent to a driver of said vehicle.

18. The mobile vehicle detailing system of claim 11, wherein water storage tank is fitted with an openable outlet to which a hose is attached.

19. The mobile vehicle detailing system of claim 18, wherein said surround box is fitted with a storage compartment adapted to store said hose.

20. The mobile vehicle detailing system of claim 11, wherein said generator is gasoline powered.

* * * * *